United States Patent
Barajas et al.

(10) Patent No.: US 9,307,785 B2
(45) Date of Patent: Apr. 12, 2016

(54) METHOD OF USING LEAF REMOVAL APPARATUS

(71) Applicant: Dole Fresh Vegetables, Inc., Westlake Village, CA (US)

(72) Inventors: Ignacio Barajas, Salinas, CA (US); Maximino Corral, Calexico, CA (US); Edgar Enrique Valdivia Rodriguez, Castroville, CA (US); Gabriel Fuentes Villasenor, Somerton, AZ (US); Manuel Maldonado Magana, Salinas, CA (US); Carlos Uribe Meza, Salinas, CA (US); Jose De Jesus Valdez, Salinas, CA (US); Dennis Johnny Castillo, Salinas, CA (US); Serafin Albarran, Salinas, CA (US); Stephen Jens, Winchester, MA (US); Richard L. Bascou, Monterey, CA (US); Frank E. Davis, Monterey, CA (US)

(73) Assignee: DOLE FRESH VEGETABLES, INC., Salinas, CA (US)

(*) Notice: Subject to any disclaimer, the term of this patent is extended or adjusted under 35 U.S.C. 154(b) by 0 days.

(21) Appl. No.: 14/742,429

(22) Filed: Jun. 17, 2015

(65) Prior Publication Data

US 2015/0282519 A1 Oct. 8, 2015

Related U.S. Application Data

(62) Division of application No. 13/742,319, filed on Jan. 15, 2013, now Pat. No. 9,078,468.

(51) Int. Cl.
*A47J 17/00* (2006.01)
*A23N 15/00* (2006.01)
*A01D 45/26* (2006.01)

(52) U.S. Cl.
CPC ............... *A23N 15/00* (2013.01); *A01D 45/26* (2013.01)

(58) Field of Classification Search
CPC ..... A01D 45/26; A01D 45/263; A01D 89/003; A23N 7/026; A23N 7/10; A23N 7/00; A23N 15/003
USPC .......... 171/38, 55, 61; 56/327.1; 99/625, 584; 426/482
See application file for complete search history.

(56) References Cited

U.S. PATENT DOCUMENTS 2,139,180 A 12/1938 Urschel
2,682,287 A * 6/1954 Rollins, Jr. ...................... 99/586
(Continued)

FOREIGN PATENT DOCUMENTS

JP 11-189928 A 7/1999
SU 1355160 A1 11/1987
(Continued)

OTHER PUBLICATIONS

Non Final Office Action received for U.S. Appl. No. 13/742,319, mailed on Oct. 27, 2014, 8 pages.
(Continued)

*Primary Examiner* — Árpád Fábián-Kovács
(74) *Attorney, Agent, or Firm* — Morrison & Foerster LLP

(57) ABSTRACT

Wrapper leaves of a harvested produce can be removed using a leaf removal apparatus. The leaf removal apparatus includes a framework, a conveyor, a stripping roller, and a plurality of flexible members. The method of using the leaf removal apparatus includes feeding a harvested produce onto a conveyor; transporting the harvested produce on the conveyor towards a stripping roller connected to a framework of the leaf removal apparatus; and contacting the harvested produce with a plurality of flexible members connected to the framework, and the stripping roller.

18 Claims, 7 Drawing Sheets

(56) References Cited

U.S. PATENT DOCUMENTS

| | | | | |
|---|---|---|---|---|
| 2,697,463 | A | * | 12/1954 | Desrosier ............... 99/517 |
| 2,997,085 | A | * | 8/1961 | Magnuson ............... 99/353 |
| 3,194,318 | A | * | 7/1965 | Boyer ..................... 171/18 |
| 3,382,901 | A | * | 5/1968 | Pheterson ............... 99/547 |
| 3,482,615 | A | * | 12/1969 | Adle et al. ............ 426/482 |
| 3,497,013 | A | * | 2/1970 | Baker .................... 171/38 |
| 3,566,942 | A | | 3/1971 | Smith |
| 3,731,477 | A | | 5/1973 | Coon |
| 3,739,854 | A | | 6/1973 | Janssen |
| 3,740,795 | A | | 6/1973 | Cox |
| 3,811,000 | A | | 5/1974 | Lazzarini |
| 3,821,987 | A | | 7/1974 | Shepardson |
| 3,827,503 | A | | 8/1974 | Hansen |
| 3,854,395 | A | | 12/1974 | Hirahara |
| 3,863,431 | A | | 2/1975 | Fowler |
| 3,989,110 | A | | 11/1976 | Medlock et al. |
| 4,234,045 | A | | 11/1980 | Porter |
| 4,262,477 | A | | 4/1981 | Turold et al. |
| 4,335,570 | A | | 6/1982 | Fitzmaurice |
| 4,507,911 | A | | 4/1985 | Wolf et al. |
| 4,516,385 | A | | 5/1985 | Lenker et al. |
| 4,519,305 | A | | 5/1985 | Vanosdall |
| 4,722,175 | A | * | 2/1988 | Hobhouse ........ A01D 51/002 56/327.1 |
| 4,884,393 | A | | 12/1989 | Hilleby |
| 4,889,045 | A | | 12/1989 | Backus |
| 5,099,636 | A | | 3/1992 | Yoder |
| 5,480,353 | A | | 1/1996 | Garza, Jr. |
| 5,560,190 | A | | 10/1996 | Ottaway |
| 5,799,474 | A | | 9/1998 | Ingram |
| 5,846,129 | A | | 12/1998 | Dragt |
| 5,964,081 | A | | 10/1999 | Ingram |
| 6,378,281 | B1 | | 4/2002 | Ottaway |
| 6,622,467 | B1 | | 9/2003 | Ottaway |
| 6,883,421 | B2 | | 4/2005 | Beaumont |
| 7,048,957 | B2 | | 5/2006 | Alsobrook et al. |
| 7,437,791 | B2 | * | 10/2008 | Williamson ......... A23N 12/005 15/3.16 |
| 7,921,628 | B2 | | 4/2011 | Meester |
| 8,272,200 | B1 | | 9/2012 | Ottaway |
| 2001/0048960 | A1 | | 12/2001 | Suter |

FOREIGN PATENT DOCUMENTS

| | | | |
|---|---|---|---|
| SU | 1544253 A1 | | 2/1990 |
| SU | 1648328 A1 | | 5/1991 |
| SU | 1687096 A1 | * | 10/1991 ............. A01D 61/00 |
| WO | 00/11961 A1 | | 3/2000 |

OTHER PUBLICATIONS

Notice of Allowance received for U.S. Appl. No. 13/742,319, mailed on Mar. 18, 2015, 5 pages.

Hangzhou Jinzhu Machinery Co. Ltd, "Peeling Machine", retrieved on Feb. 15, 2013, 2 pages.

\* cited by examiner

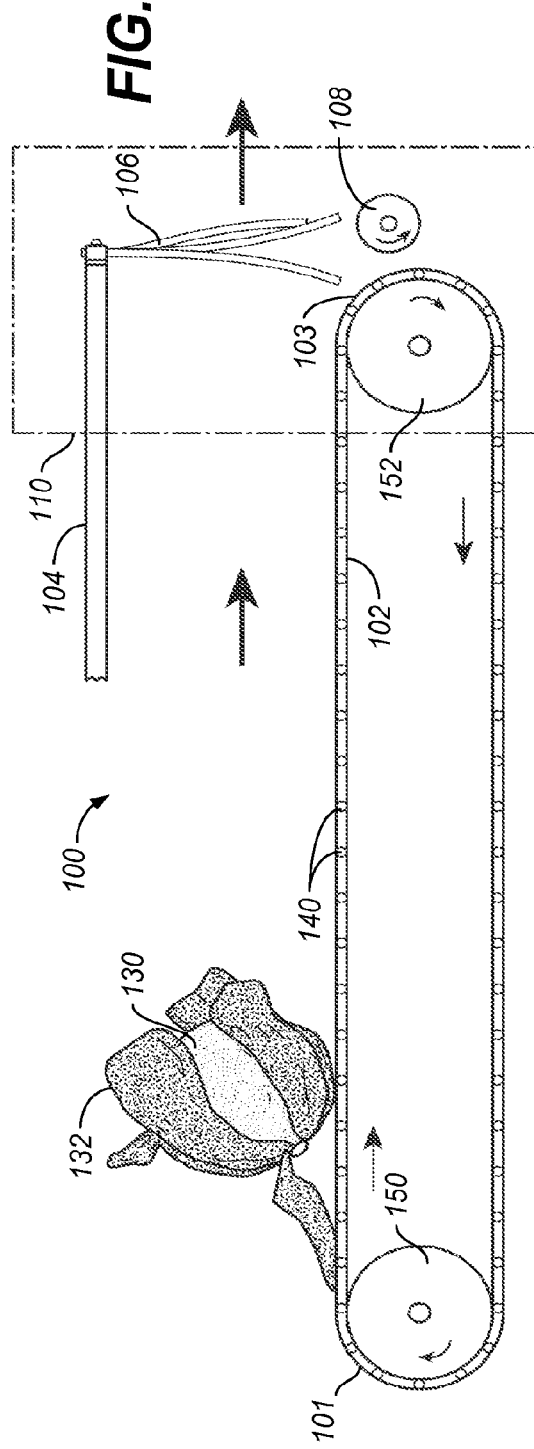
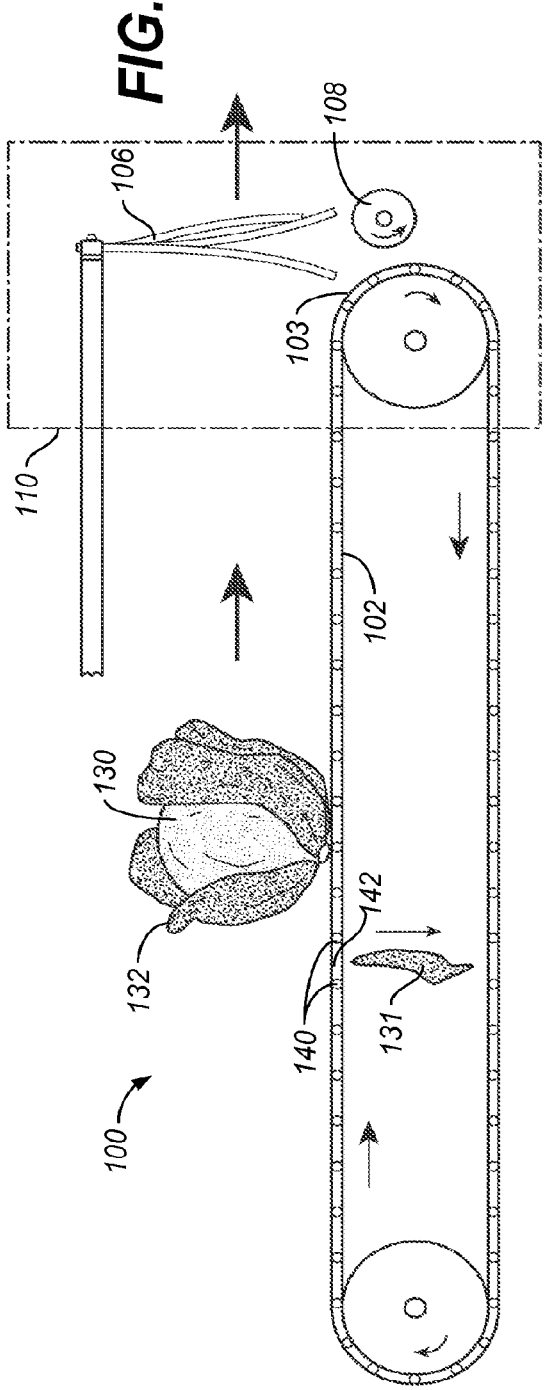

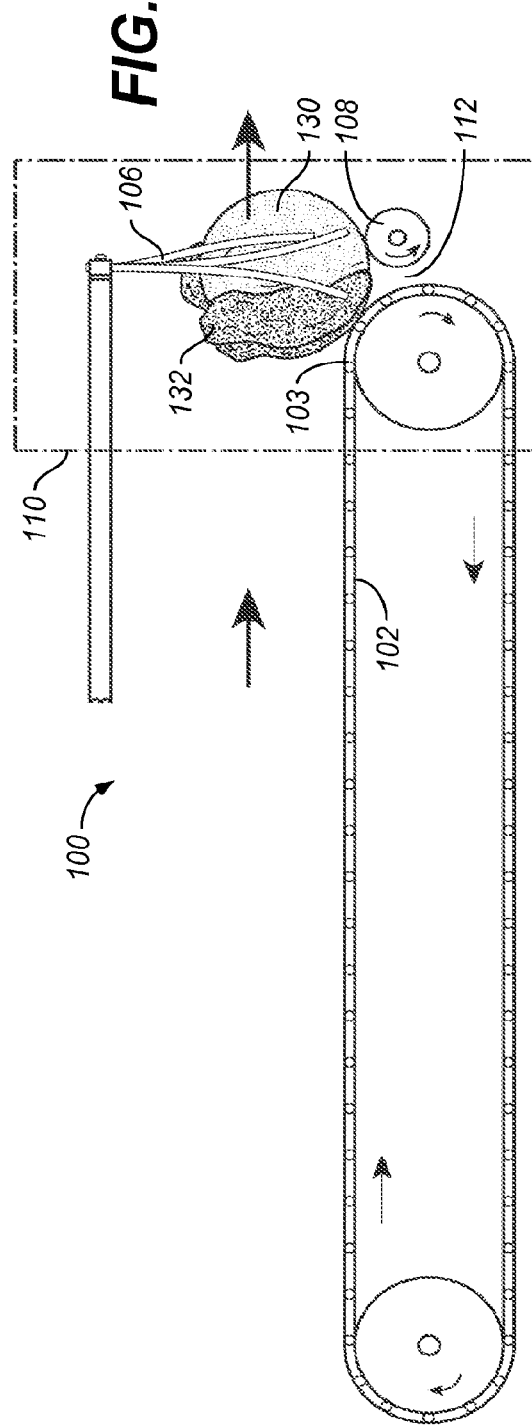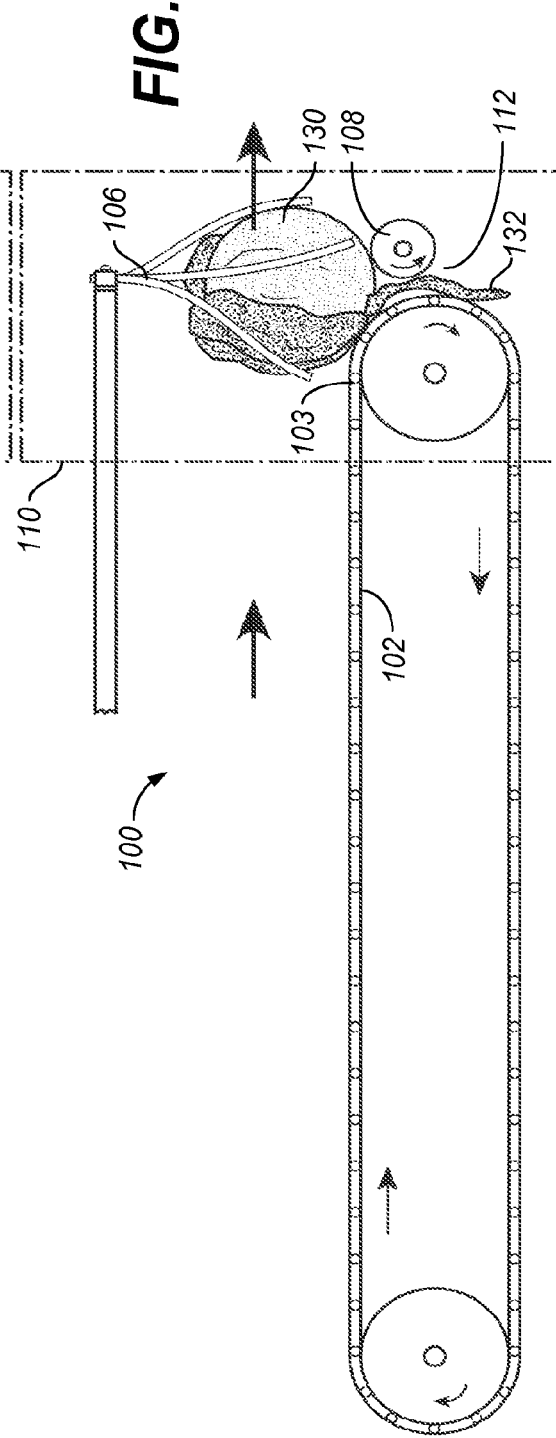

METHOD OF USING LEAF REMOVAL APPARATUS

CROSS REFERENCE TO RELATED APPLICATIONS

This application is a Divisional of U.S. patent application Ser. No. 13/742,319, filed Jan. 15, 2013, which is hereby incorporated by reference in its entirety.

BACKGROUND

1. Field

The present disclosure relates generally to commercial produce processing, and more specifically to mechanically removing wrapper leaves from a harvested produce.

2. Related Art

The commercial produce industry is a multi-billion dollar industry. For example, lettuce is produced and shipped year round in the U.S. with the source of supplies changing with the seasons, with California and Arizona dominating U.S. production. Three types of lettuce dominate commercial production: iceberg, leaf lettuce, and romaine lettuce. Of these three types, iceberg lettuce makes up the majority of the commercial lettuce production in the U.S.

Conventionally, the harvesting of lettuce is predominately performed by hand. Field workers will typically hand cut the lettuce from its roots, and place the cut lettuce on a moving platform for subsequent processing and packaging. As part of the subsequent processing steps, outer leaves of the cut lettuce is typically removed for various reasons, such as unpalatable texture. These outer leaves that loosely wrap around a lettuce head are also referred to as "wrapper leaves". The removal of wrapper leaves is conventionally a labor-intensive process performed by field workers, which requires workers to manually remove the wrapper leaves without damaging the delicate lettuce head.

Thus, what is needed in the art is a way to efficiently remove wrapper leaves from a harvested produce head without damaging the produce head before sending the produce head for further processing and packaging.

BRIEF SUMMARY

In one exemplary embodiment, an apparatus for removing one or more wrapper leaves of a harvested produce is provided. The apparatus includes a framework, a stripping roller, a conveyor, and a plurality of flexible members. The conveyor is configured to transport the harvested produce towards the stripping roller. The stripping roller is connected to the framework, and is configured to rotate and exert a frictional force on the harvested produce to remove one or more wrapper leaves of the harvested produce. A gap exists between the stripping roller and the output end of the conveyor, and one or more of the removed wrapper leaves may fall through the gap. The plurality of flexible members is also connected to the framework, and hangs vertically over the output end of the conveyor or over the gap. These flexible members are configured to loosen or remove one or more wrapper leaves of the harvested produce as the harvested produce moves across the gap, and may also help to rotate the harvested produce as it is moving down the conveyor causing one or more wrapper leaves to peel off.

Also provided is a mechanical method of removing one or more wrapper leaves of a harvested produce using a leaf removal apparatus. The method includes feeding a harvested produce onto a conveyor; transporting the harvested produce on the conveyor towards a stripping roller connected to a framework of the leaf removal apparatus; and contacting the harvested produce with the stripping roller to remove one or more wrapper leaves. The stripping roller is configured to rotate and exert a frictional force on the harvested produce to remove one or more wrapper leaves of the harvested produce. A gap exists between the stripping roller and the output end of the conveyor, and one or more of the removed wrapper leaves may fall through the gap. The method may also further include contacting the harvested produce with a plurality of flexible members connected to the framework. The flexible members hang vertically over the output end of the conveyor or over the gap, and are configured to loosen or remove one or more wrapper leaves of the harvested produce. The flexible members may also help to rotate the harvested produce as it is moving down the conveyor causing one or more wrapper leaves to peel off.

DESCRIPTION OF THE FIGURES

The present application can be best understood by references to the following description taken in conjunction with the accompanying figures, in which like parts may be referred to by like numerals:

FIGS. 1A, 1B, 1C, and 1D depict an exemplary embodiment of a leaf removal apparatus and the removal of wrapper leaves from a harvested produce;

DETAILED DESCRIPTION

Figure 2:
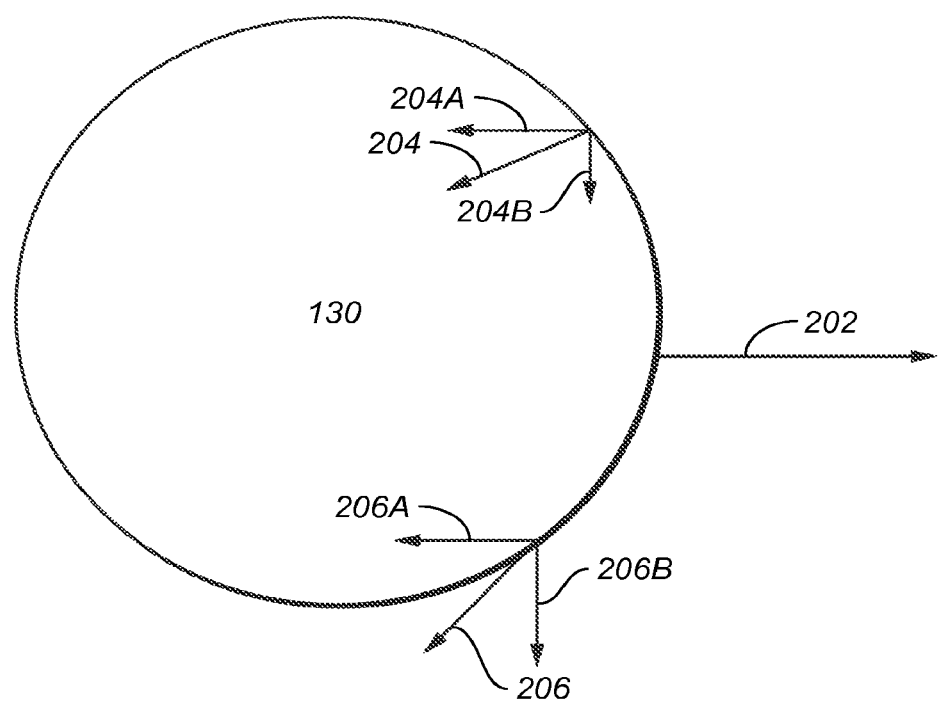
FIG. 2 depicts a free-body diagram of a harvested produce in the leaf stripping area of the leaf removal apparatus, illustrating the forces exerted on the harvested produce by the conveyor, a flexible member, and the stripping roller.

To provide a more thorough understanding of the present invention, the following description sets forth numerous specific details, such as specific configurations, parameters, examples, and the like. It should be recognized, however, that such description is not intended as a limitation on the scope of the present invention but is intended to provide a better description of exemplary embodiments.

With reference to FIGS. 1A-D, an exemplary leaf removal apparatus 100 is depicted. As described below, apparatus 100 is configured to remove one or more wrapper leaves 132 from harvested produce 130. As depicted in FIGS. 1A-D, in the present embodiment, harvested produce 130 is iceberg lettuce, which is also commonly referred to as crisphead or head lettuce. It should be understood, however, that apparatus 100 may be used for other types of harvested produce. For example, apparatus 100 may be used to remove wrapper leaves of harvested leaf lettuce, romaine lettuce or cabbage.

With reference to FIG. 1A, apparatus 100 includes framework 104, flexible members 106, stripping roller 108, and conveyor 102. In this exemplary embodiment, flexible members 106 and stripping roller 108 are connected to framework 104. Both are positioned and configured to work together to remove one or more wrapper leaves 132 from harvested produce 130 in leaf stripping area 110. Apparatus 100 also includes conveyor 102, which is configured to receive and transport harvested produce 130 towards leaf stripping area 110. While in some embodiments, conveyor 102 may be connected to framework 104, conveyor 102 may have its own independent framework.

With reference again to FIG. 1A, conveyor 102 is configured to receive harvested produce 130 at input end 101, and transport harvested produce 130 towards leaf-stripping area 110. As depicted in FIG. 1A, in this exemplary embodiment, conveyor 102 is made up of a set of parallel rods 140. It should be understood, however, that in other embodiments, conveyor 102 may be a belt. Moreover, as depicted in FIG. 1A, in this exemplary embodiment, conveyor 102 wraps around sprockets 150 and 152. Once rods moving away from input end 101 reach leaf stripping area 110, the rods wrap around sprocket 152 and move back towards input end 101. It should be understood, however, that in other embodiments, conveyor 102 may be configured differently. For example, conveyor 102 may be configured such that rollers may be used in lieu of sprockets.

With reference to FIG. 1B, in this exemplary embodiment where the conveyor is made up of a set of parallel rods, conveyor 102 is configured to have space 142 between two rods. Space 142 is narrow enough to avoid harvested produce 130 from falling through, but wide enough to allow detached wrapper leaf 131 to fall through space 142 onto the ground. It should be understood that if conveyor 102 is a belt, as discussed above, space 142 may not exist in such a configuration of the leaf removal apparatus, since the belt would be a continuous piece of material.

With reference to FIG. 1C, in this exemplary embodiment, output end 103 of conveyor 102, flexible members 106, and stripping roller 108 work together in leaf stripping area 110 to loosen and remove one or more wrapper leaves 132. Flexible members 106 may facilitate the removal of one or more wrapper leaves from harvested produce 130 in a number of ways. For example, as depicted in FIG. 1C, flexible members 106 brush over the surface of harvested produce 130 and may loosen one or more wrapper leaves 132 from harvested produce 130. In other instances (not depicted in FIG. 1C), one or more wrapper leaves may completely detach from the harvested product as a result of the contact with the flexible members. Further, flexible members 106 may slow down the forward movement of harvested produce 130 or even hold the produce over the gap (element 112) between the output end of the conveyor and the stripping roller. As such, flexible members 106 may help to prolong the duration of contact between harvested produce 130 and stripping roller 108. Flexible members 106 may also help to rotate harvested produce 130 as it is moving down conveyor 102 causing one or more wrapper leaves to peel off.

While flexible members 106 are depicted in FIGS. 1A-D as hanging vertically over gap 112, it should be recognized that in other embodiments, flexible members 106 may hang vertically over output end 103 of conveyor 102.

Flexible members 106 may be made of any flexible material that would not damage harvested produce 130 upon contact. For example, flexible members 106 can be formed from urethane. Flexible members 106 may also take different forms. For example, flexible members 106 may be in form of ropes.

With reference to FIG. 1D, stripping roller 108 (as depicted) rotates counterclockwise. When harvested produce 130 comes in contact with stripping roller 108, stripping roller 108 may loosen wrapper leaf 132 from harvested produce 130, or remove wrapper leaf 132. Flexible members 106 can help to push any loosen wrapper leaves into gap 112, causing the stripped wrapper leaf to fall to the ground.

Stripping roller 108 can be made of any material, such as rubber, metal, or plastic. In some embodiments, the surface of stripping roller 108 is textured. The texture can help to create a frictional force useful for loosening and removing one or more of the wrapper leaves. Any texture on stripping roller 108, however, is selected to minimize damage to the inner leaves of the harvested produce. It should be understood that the texture of the surface of stripping roller 108 may vary depending on the type, size, and maturity of the harvested produce processed. For example, when the produce is harvested at a less mature stage, the wrapper leaves are typically more tightly attached to the harvested produce. As such, the stripping roller may be textured to generate enough of frictional force to loosen and remove wrapper leaves. It should also be understood that, in certain embodiments, the surface of the stripping roller can be smooth if the material of the stripping roller can create a frictional force to help remove the wrapper leaves.

FIG. 2 is a free-body-diagram depicting some of the forces that can be exerted on harvested produce 130 while in contact with the conveyor, flexible members, and stripping roller. The conveyor imparts force 202 on harvested produce 130. The flexible members, which provide some resistance against harvested produce 130, impart force 204 on the harvested produce 130. One of skill in the art would recognize that force 204 is the sum of forces 204A and 204B. The stripping roller, which rotates in a counterclockwise direction, imparts force 206 on harvested produce 130. One of skill in the art would recognize that force 206 is the sum of forces 206A and 206B.

The sum of forces 202, 204A and 206A (as depicted in FIG. 2) determines whether harvested produce remains in the gap between the stripping roller and the output end of the conveyor or moves forward beyond the gap, for example, to a second conveyor, a container, or another processing station. For example, if force 202 exceeds the sum of force 204A and 206A, then harvested produce 130 would tumble forward past the gap. If force 202 equals the sum of force 204A and 206A, then harvested produce 130 would sit in the gap until another harvested produce from behind pushes harvested produce 130 forward.

Forces 204B and 206B are depicted in FIG. 2 as downward forces that can contribute to the removal of wrapper leaves on harvested produce 130. For example, if the flexible member comes in contact with one or more wrapper leaves where force 204 is exerted, the downward component of force 204 (i.e., force 204B) can help to loosen and remove one or more wrapper leaves from harvested produce 130. Similarly, if the stripping roller comes in contact with one or more wrapper leaves where force 206 is exerted, the downward component of force 206 (i.e., force 206B) can help to loosen and remove one or more wrapper leaves from harvested produce 130.

The amount of force exerted on harvested produce 130 by the conveyor, flexible members, and stripping roller may vary based on numerous factors including the type of produce processed, the maturity of the harvested produce, and the pace at which harvested produce are fed onto the conveyor. The amount of force 202 exerted by the conveyor may be varied by controlling the speed of the conveyor. The amount of force 204 exerted by the flexible members may be varied by the type of material used. The amount of force 206 exerted by the stripping roller may be varied by controlling the rotational speed of the stripping roller. The speed of the conveyor and the rotational speed of the stripping roller may be coordinated to optimize the overall forces exerted on the harvested produce. For example, in one embodiment, the ratio between the rotational speed of the stripping roller to the speed of the conveyor is between 1 to 4 (e.g., 1, 2, 3 or 4).

Figure 3A:
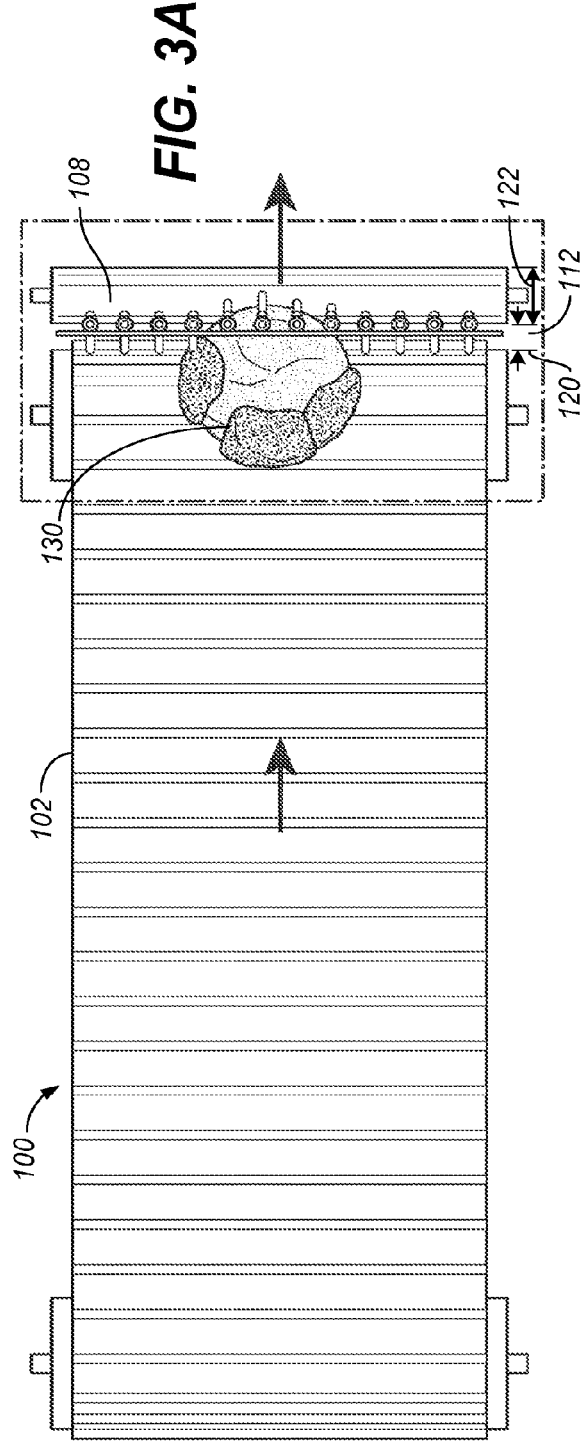
FIGS. 3A (top view) and 3B (front view) depict different view of the leaf-stripping area in the exemplary embodiment of FIG. 1.
Figure 3B:
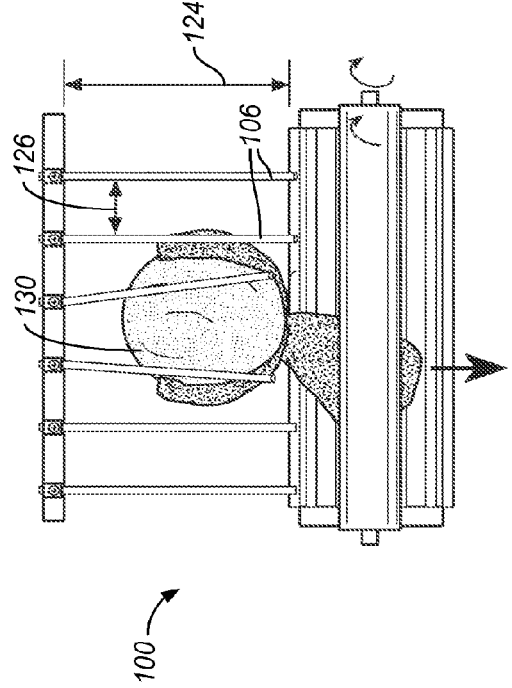

With reference to FIGS. 3A and 3B, several other factors may be optimized to control effectiveness of leaf removal of apparatus 100 including, for example, the diameter of the stripping roller, the width of the gap between the stripping roller and the output end of the conveyor, the length of the flexible members, and the width between each flexible member.

With reference to FIG. 3A, the diameter (element 122) of stripping roller 108 may be varied depending on the type, size and maturity of the produce used on apparatus 100. Diameter 122 is typically between 0.5 inch and 5 inches. In an exemplary embodiment where harvested produce is iceberg lettuce, diameter 122 of stripping roller 108 may be about 1.5 inches.

With reference again to FIG. 3A, gap 112 exists between the longitudinal axis of stripping roller 108 and the horizontal edge of output end 103 of conveyor 102. The width (element 120) of gap 112 may be varied depending on the type, size and maturity of the produce used on apparatus 100. Width 120 is typically between 0.5 to 3 inches. In one embodiment where harvested produce is iceberg lettuce, width 120 is about 1 inch. It should be understood that width 120 may be wider if harvested produce 130 is larger in size, and narrower if harvested produce 130 is smaller in size.

With reference to FIG. 3B, length 124 of the flexible members may be varied depending on the type, size and maturity of the produce used on apparatus 100. Length 124 is typically between 6 to 24 inches. In one embodiment where harvested produce is iceberg lettuce, length 124 is about 12 inches. It should be understood that length 124 may be longer if harvested produce 130 is larger in size, and shorter if harvested produce 130 is smaller in size. It should be understood that while flexible members 106 may all be the same length, the lengths may also be unequal and differ slightly from one flexible member to another.

With reference again to FIG. 3B, width 126 between two flexible members may be varied depending on the type, size and maturity of the produce used on apparatus 100. Width 126 is typically between 1 to 10 inches. In one embodiment where harvested produce is iceberg lettuce, width 126 is about 4 inches. It should be understood that width 126 may be wider if harvested produce 130 is larger in size, and narrower if harvested produce 130 is smaller in size. It should be understood that while the space between two flexible members 106 may all be the same width, the widths may also be unequal and differ slightly between one set of adjacent flexible members to another set of adjacent flexible members.

Additionally, while FIG. 3B depicts two flexible members in contact with harvested produce 130, it should be understood that harvested produce 130 may not always be in contact with two flexible members. For example, in some instances, harvested produce 130 may be in contact with only one flexible member, and wrapper leaves 132 may still be loosened and removed as described above.

Figure 4:
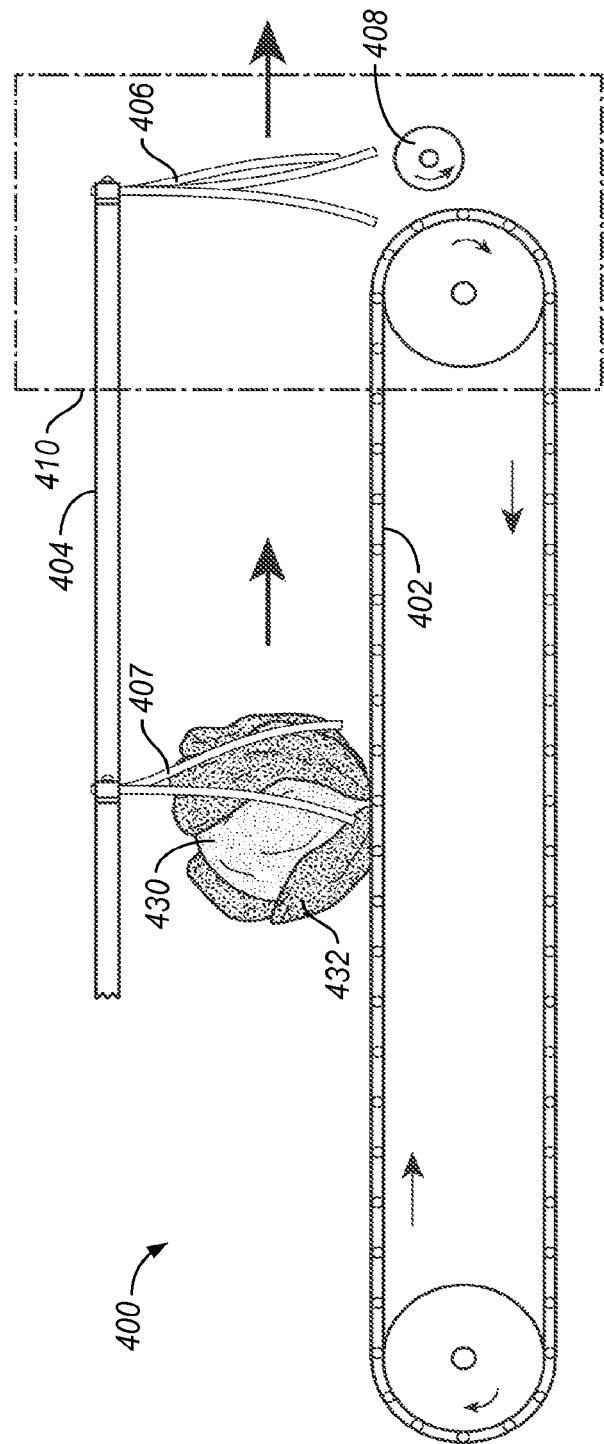
FIG. 4 depicts another exemplary embodiment of a leaf removal apparatus with two sets of flexible members, where one set hangs over the conveyor before reaching the leaf stripping area, and the other set hangs over the gap between the stripping roller and the output end of the conveyor in the leaf stripping area.

While apparatus 100 depicted in FIGS. 1-3 has one set of flexible members, in other exemplary embodiments, a leaf removal apparatus may have one or more additional sets of flexible members. For example, the additional sets of flexible members may be positioned outside of the leaf-stripping area. FIG. 4 depicts an exemplary leaf removal apparatus 400 that has a second set of flexible members 407. In other embodiments, leaf removal apparatus may not have any flexible members. In such an embodiment, the conveyor and stripping roller are positioned and configured to work together to loosen and remove one or more wrapper leaves from a harvested produce.

With reference to FIG. 4, apparatus 400 includes framework 404, a first set of flexible members 406, a second set of flexible members 407, stripping roller 408, and conveyor 402. In this exemplary embodiment, flexible members 406 and stripping roller 408 are connected to framework 404, and are positioned and configured to work together to remove one or more wrapper leaves 432 from a harvested produce 430 in leaf stripping area 410. A second set of flexible members 407 is connected to framework 404, and hangs vertically over conveyor 402. In this exemplary embodiment, flexible members 407 comes in contact with harvested produce 430 before the harvested produce reaches leaf stripping area 410. Flexible members 407 can help to loosen and even remove loose wrapper leaves 432 of harvested produce 430, before the harvested product reaches leaf stripping area 410.

Figure 5:
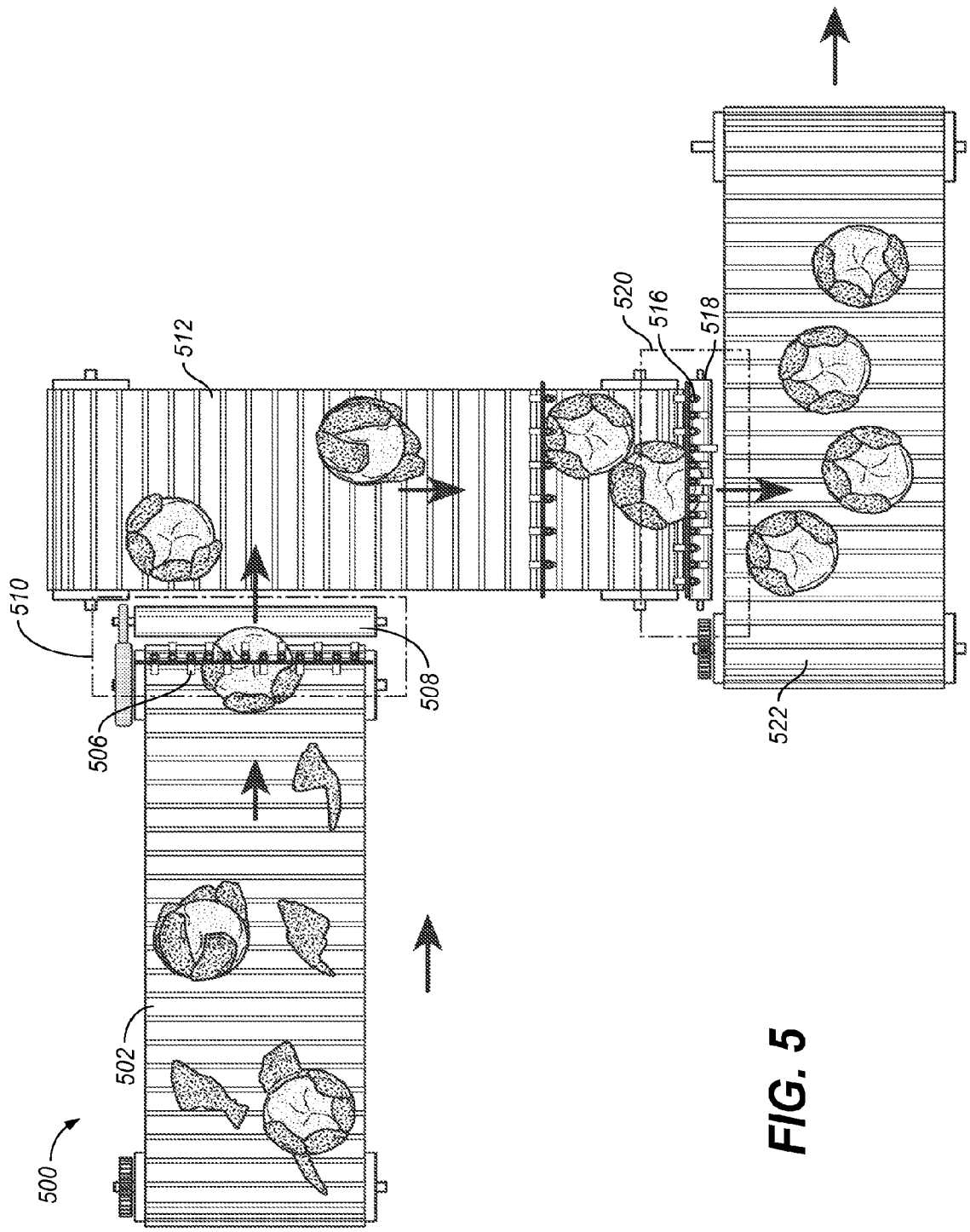
FIG. 5 depicts yet another exemplary embodiment of a leaf removal apparatus with two leaf stripping areas.

While apparatus 100 depicted in FIGS. 1-3 has one leaf stripping area, in other exemplary embodiments, a leaf removal apparatus may have more two or more leaf-stripping areas. FIG. 5 depicts an exemplary leaf removal apparatus 500 that has two leaf stripping areas, 510 and 520. Apparatus 500 includes conveyors 502 and 512, flexible members 506 and 516, and stripping rollers 508 and 518. The first conveyor, i.e., conveyor 502, is configured to move a plurality of harvested produce towards leaf stripping area 510, where the harvested produce comes into contact with flexible members 506 and stripping roller 508. In some instances, apparatus 500 may have removed all the wrapper leaves of a given harvested produce; but in other instances, apparatus may have only loosed the wrapper leaves of the harvested produce, or removed some of the wrapper leaves. Apparatus 500 also includes a second conveyor, i.e., conveyor 512, configured to receive harvested produce from leaf stripping area 510 and to move the harvested produce towards leaf stripping area 520, where the harvested produce comes into contact with flexible members 516 and stripping roller 518 to remove one or more of any remaining wrapper leaves on the harvested produce. Additionally, apparatus 500 includes conveyor 522 configured to receive harvested produce from leaf stripping area 520, and to move the harvested produce to a container or bin, or another processing station, such as a washing, inspection or packaging station.

While FIGS. 1-5 depict exemplary leaf removal apparatuses as a standalone apparatus, the leaf removal apparatus may be part of a larger mechanical harvester. For example, the leaf removal apparatus may be connected to a cutting and transporting apparatus of a mechanical harvester. The cutting and transporting apparatus can sever produce in the field, transport the harvested produce to the back of the mechanical harvester, and deliver the harvested produce to the input end of a conveyor of the leaf removal apparatus. The leaf removal apparatus may also be connected to one or more processing stations, including for example stations for inspecting, sorting, washing, and packaging the harvested produce.

Figure 6:
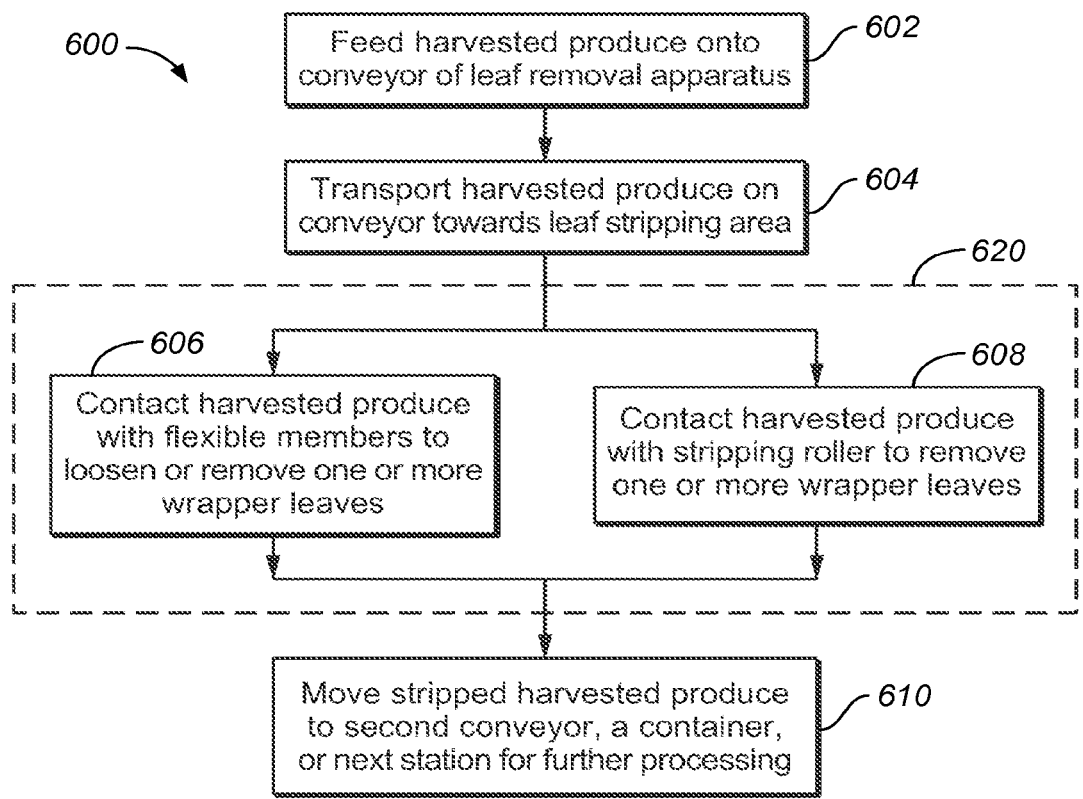
FIG. 6 is a flow chart depicting an exemplary method of removing one or more wrapper leaves of a harvested produce using a leaf removal apparatus.

Provided herein is also a method for removing wrapper leaves of produce. With reference to FIG. 6, process 600 depicts an exemplary process for removing one or more wrapper leaves of a harvested produce using any of the leaf removal apparatuses described herein. In step 602, a harvested produce is fed onto a conveyor of a leaf removal apparatus. The conveyor may be connected to a framework of the leaf removal apparatus, or the conveyor may have its own independent framework. In step 604, the harvested produce is transported on the conveyor towards the leaf stripping area of the leaf removal apparatus. The leaf area includes the output end of the conveyor, as well as the stripping roller and a plurality of flexible members both of which are connected to the framework of the leaf removal apparatus. As discussed above, however, flexible members may not be present in certain embodiments of the leaf removal apparatus.

In this exemplary method, the leaf removal apparatus used has a set of flexible members that hang vertically over the leaf stripping area. With reference again to FIG. 6, in step 606, the harvested produce comes into contact with the flexible members, which are configured to loosen or remove one or more wrapper leaves. In step 608, the harvested produce comes into contact with the stripping roller, which is configured to rotate and exert a force to remove one or more wrapper leaves. It should be understood that steps 606 and 608 may occur at about the same time in the leaf stripping area (depicted by box 620).

As described above with respect to the exemplary leaf removal apparatuses, a gap exists between the longitudinal axis of stripping roller and the horizontal edge of the output end of the conveyor. One or more of the removed wrapper leaves may fall through this gap, to prevent these wrapper leaves from moving on in the harvesting process.

In step 610, the stripped harvested produce moves across the gap of the leaf stripping area and falls onto a second conveyor, a container, or another processing platform or station. The stripped harvested produce may move across the gap, away from the leaf stripping area, by momentum of the harvested produce as it was transported by the conveyor. Additionally, the stripped harvested produce may move across the gap by a push from a second harvested produce from behind. It should be understood that a plurality of harvested produce may be processed using the leaf removal apparatus described above.

The foregoing descriptions of specific embodiments have been presented for purposes of illustration and description. They are not intended to be exhaustive, and it should be understood that many modifications and variations are possible in light of the above teaching.

What is claimed is:

1. A mechanical method of removing one or more wrapper leaves of a harvested produce using a leaf removal apparatus, the method comprising:
   feeding a harvested produce onto a conveyor;
   transporting the harvested produce on the conveyor towards a stripping roller connected to a framework of the leaf removal apparatus,
      wherein a gap exists between the stripping roller and an output end of the conveyor;
   contacting the harvested produce with (i) a plurality of flexible members connected to the framework, wherein the plurality of flexible members hangs vertically over the output end of the conveyor or over the gap, and (ii) the stripping roller; and
   loosening or removing one or more wrapper leaves of the harvested produce by contact with the plurality of flexible members, or the stripping roller configured to rotate and exert a frictional force on the harvested produce, or a combination thereof,
      wherein one or more of the removed wrapper leaves fall through the gap.

2. The method of claim 1, wherein one or more wrapper leaves of the harvested produce are loosened or removed by contact with the stripping roller as the harvested produce moves across the gap.

3. The method of claim 1, wherein the plurality of flexible members hangs vertically over the gap, and one or more wrapper leaves of the harvested produce are loosened or removed as the harvested produce moves across the gap.

4. The method of claim 1, wherein the stripping roller has a smooth or textured surface.

5. The method of claim 1, wherein the stripping roller rotates at a speed that is at least twice as fast as the speed at which the conveyor transports the harvested produce.

6. The method of claim 1, wherein the stripping roller has a diameter between 1 inch and 2 inches.

7. The method of claim 1, wherein the conveyor comprises a set of parallel rods, and wherein a space exists between adjacent rods.

8. The method of claim 1, wherein the gap between the stripping roller and the output end of the conveyor is between 0.5 inches and 4 inches.

9. The method of claim 1, wherein one or more of the removed wrapper leaves are pushed through the gap by the plurality of flexible members.

10. The method of claim 1, wherein the conveyor has a transporting surface, and wherein the stripping roller is positioned at a level below the transporting surface of the conveyor.

11. The method of claim 1, wherein the harvested produce is a harvested lettuce or a harvested cabbage.

12. The method of claim 11, wherein the harvested produce is a harvested iceberg lettuce.

13. A mechanical method of removing one or more wrapper leaves of a harvested produce using a leaf removal apparatus, the method comprising:
   feeding a first and second harvested produce onto a conveyor,
      wherein the second harvested produce is fed after the first harvested produce;
   transporting the first harvested produce towards a stripping roller connected to a framework of the leaf removal apparatus,
      wherein a gap exists between the stripping roller and an output end of the conveyor;
   contacting the first harvested produce with (i) a plurality of flexible members connected to the framework, wherein the plurality of flexible members hangs vertically over the output end of the conveyor or over the gap, and (ii) the stripping roller;
   loosening or removing one or more wrapper leaves of the first harvested produce by contact with the plurality of flexible members, or the stripping roller configured to rotate and exert a frictional force on the first harvested produce, or a combination thereof,
      wherein one or more of the removed wrapper leaves of the first harvested produce fall through the gap;
   transporting the second harvested produce towards the stripping roller;
   contacting the second harvested produce with the first harvested produce; and
   pushing the first harvested produce through the gap towards a second conveyor or a container.

14. The method of claim 13, further comprising:
   contacting the second harvested produce with the stripping roller; and
   removing one or more wrapper leaves of the second harvested produce by contact with the stripping roller configured to rotate and exert a frictional force on the second harvested produce,
      wherein one or more of the removed wrapper leaves of the second harvested produce fall through the gap.

15. The method of claim 13, wherein the harvested produce is a harvested lettuce or a harvested cabbage.

16. The method of claim 15, wherein the harvested produce is a harvested iceberg lettuce.

17. The method of claim 13, wherein one or more wrapper leaves of the harvested produce are removed by contact with the stripping roller as the harvested produce moves across the gap.

18. The method of claim 13, wherein the plurality of flexible members hangs vertically over the gap, and one or more wrapper leaves of the harvested produce are loosened or removed as the harvested produce moves across the gap.

* * * * *